United States Patent [19]

Kamiya et al.

[11] Patent Number: 5,195,396
[45] Date of Patent: Mar. 23, 1993

[54] TORQUE VARIATION ABSORBING DEVICE

[75] Inventors: Masakazu Kamiya; Junji Kagiyama, both of Toyoake; Kiyonori Kobayashi, Chiryu; Masaki Hosono, Toyota, all of Japan

[73] Assignees: Aisin Seiki Kabushiki Kaisha, Kariya; Toyota Jidosha Kabushiki Kaisha, Toyota, both of Japan

[21] Appl. No.: 841,201

[22] Filed: Feb. 27, 1992

Related U.S. Application Data

[63] Continuation of Ser. No. 599,103, Oct. 17, 1990.

[30] Foreign Application Priority Data

Oct. 19, 1989 [JP] Japan .............. 1-122638[U]

[51] Int. Cl.$^5$ ............................................. F16F 15/12
[52] U.S. Cl. .................................. 74/574; 192/106.2; 384/507
[58] Field of Search ............... 74/172, 574; 192/106.2, 192/110 B; 464/68, 66; 384/508, 507, 482

[56] References Cited

U.S. PATENT DOCUMENTS

| | | | |
|---|---|---|---|
| 1,194,679 | 8/1916 | Strom | 384/507 |
| 1,301,295 | 4/1919 | Mossig | 384/507 |
| 2,143,091 | 1/1939 | Searles | 384/508 |
| 4,663,983 | 5/1987 | Kobayashi et al. | 192/106.2 |
| 4,727,767 | 3/1988 | Aiki et al. | 74/574 |
| 4,876,917 | 10/1989 | Aiki et al. | 192/106.2 |
| 4,932,921 | 6/1990 | Kobayashi et al. | 192/106.2 |
| 4,989,710 | 2/1991 | Reik et al. | 74/574 |

FOREIGN PATENT DOCUMENTS

| | | |
|---|---|---|
| 0155661 | 11/1904 | Fed. Rep. of Germany ...... 384/508 |
| 60-252837 | 12/1985 | Japan . |
| 61-23545 | 2/1986 | Japan . |
| 63-42950 | 3/1988 | Japan . |
| 1-35326 | 3/1989 | Japan . |

Primary Examiner—David A. Scherbel
Assistant Examiner—Winnie Yip
Attorney, Agent, or Firm—Burns, Doane, Swecker & Mathis

[57] ABSTRACT

A torque variation absorbing device includes a first flywheel and a second flywheel which are rotatable relative to each other via a ball bearing. A hysteresis mechanism is disposed between the first flywheel and the second flywheel so that the first flywheel and the second flywheel are biased in directions away from each other. The ball bearing includes an outer race, an inner race, and a plurality of balls disposed in a space defined between the outer race and the inner race. A ball inlet groove is formed in each of the outer race and the inner race so that the each ball inlet groove opens toward the hysteresis mechanism. The hysteresis mechanism pushes the outer race and the outer race pushes the balls so that the pushed balls push the inner race in a direction away from the hysteresis mechanism. The portion of a ball guide groove formed in the inner race pushed by the balls is continuous in a circumferential direction of the torque variation absorbing device so that an abrasion of the balls due to a discontinuous portion of the inner race does not occur.

13 Claims, 5 Drawing Sheets

FIG. 7
PRIOR ART
FIG. 8
PRIOR ART
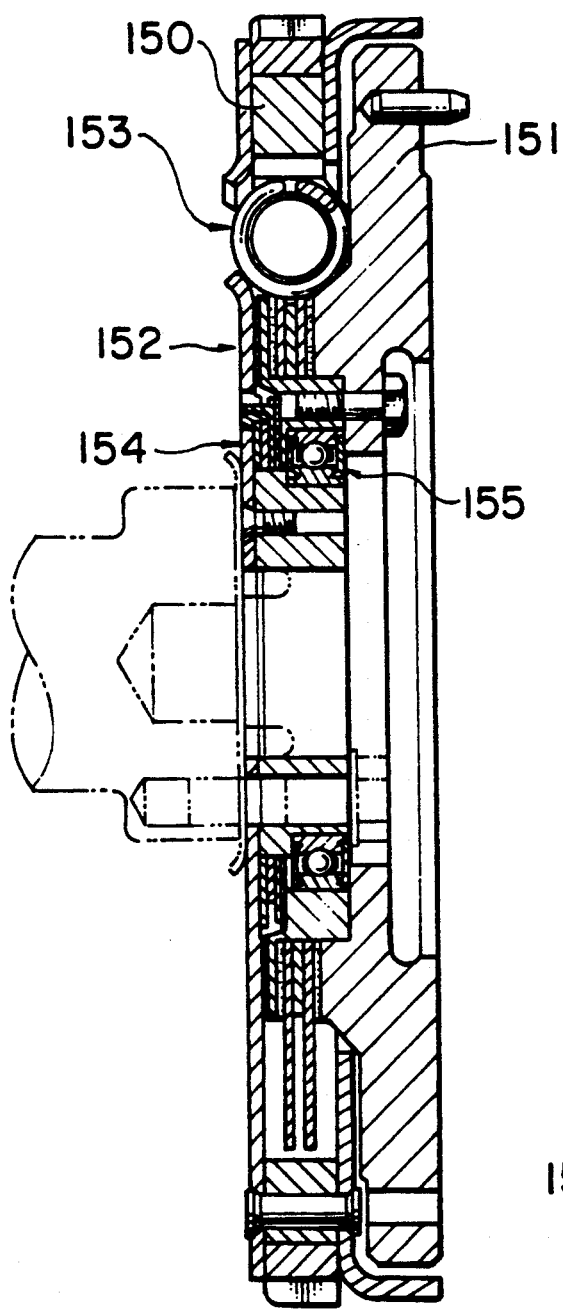
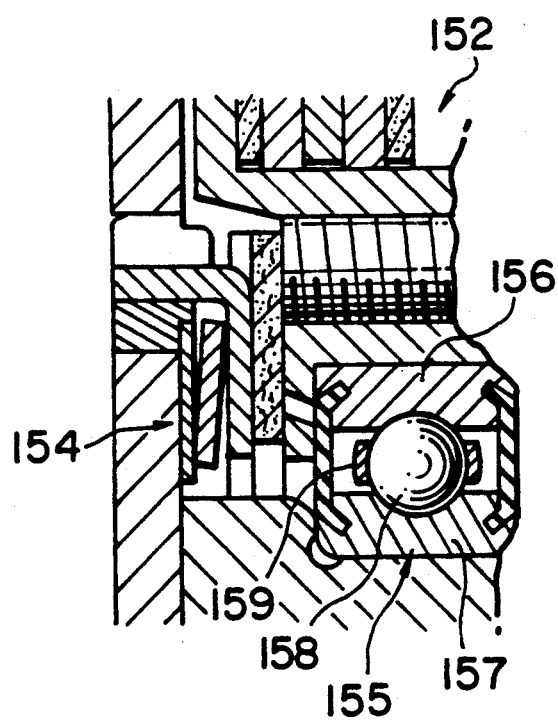

TORQUE VARIATION ABSORBING DEVICE

This application is a continuation of application Ser. No. 599,103, filed Oct. 17, 1990.

BACKGROUND OF THE INVENTION

1. Field of the Invention

The present invention relates to a torque variation absorbing device to be mounted in a torque transmission path of an automobile, an industrial vehicle, and a ship, etc.

2. Description of the Related Art

FIG. 7, identified as Prior Art illustrates a conventional torque variation absorbing device disclosed in Japanese Utility Model Publication SHO 61-23545. As illustrated in FIG. 7, the torque variation absorbing device includes a drive side flywheel 150, a driven side flywheel 151, a torque limiting mechanism 152, a spring mechanism 153 (a damping mechanism), and a hysteresis mechanism 154. The torque limiting mechanism 152, the spring mechanism 153 and the hysteresis mechanism 154 are disposed between the drive side flywheel 150 and the driven side flywheel 151. A bearing 155 is installed between the drive side flywheel 150 and the driven side flywheel 151 so that the drive side flywheel 150 and the driven side flywheel 151 are rotatable relative to each other about a common rotational axis.

FIG. 8, identified Prior Art illustrates the structure of the ball bearing 155 more in detail. As illustrated in FIG. 8, the ball bearing 155 includes an outer race 156, an inner race 157, a plurality of balls 158, and a retainer 159. The balls 158 are equally spaced from each other in a space defined between the outer race 156 and the inner race 157 and are held by the retainer 159 so that the distance between two adjacents balls are maintained constant. This type of ball bearing where a gap is provided between any two adjacent balls is called a deep groove ball bearing.

FIG. 5, identified as Prior Art illustrates how to assemble a usual deep groove ball bearing. In the assembly, firstly, a center of an inner race 101 is offset from a center of an outer race 100 so that a space having the shape of a crescent 102 is formed between the outer race 100 and the inner race 101. Then, balls 103 are inserted into the space 102 at widest portion thereof. After all the balls 103 have been inserted, the outer race 100 and the inner race 101 are made coaxial to each other. According to this assembly, the number of the balls to be inserted is limited. As a result, the load capacity of the ball bearing is limited. Further, it is necessary to hold the balls 103 by means of a retainer 104 or 104' as shown in FIG. 6a or FIG. 6b, both identified as Prior Art in order to prevent the balls from collecting to one part of the space 102 in the circumferential direction of the ball bearing.

For the purpose of increasing the load capacity of the ball bearing, it might be effective to use another type of ball bearing provided with a greater number of balls inserted in a space defined between an outer race and an inner race. Such a ball bearing is disclosed in Japanese Patent Publication SHO 60-252837. The ball bearing of the Publication SHO 60-252837 includes a drive disk coupled to a crankshaft and a flywheel rotatably supported by the drive disk via a ball bearing. The ball bearing includes an outer race, an inner race and a plurality of balls. The balls are arranged in the circumferentially extended space defined between the outer race and the inner race so that any two adjacent balls contact each other in the circumferential direction of the ball bearing.

However, there are some problems with the above-described conventional ball bearings.

With respect to the deep groove ball bearing, since the number of the balls is limited, a load to be born by each ball is great. As a result, the balls tend to be abraded in a relatively short period of time, and the life of the ball bearing is relatively short.

With respect to the ball bearing wherein two adjacent balls contact each other, since ball inlet grooves should be formed in the outer race and the inner race of the ball bearing so that the balls can be inserted into the space defined between the outer race and the inner race through the ball inlet grooves, ball guide grooves formed in the outer race and the inner race are discontinuous in the circumferential direction of the ball bearing. In the case of a torque variation absorbing device including a hysteresis mechanism, an axial force generated by a cone spring of the hysteresis mechanism continuously acts on the ball bearing. Therefore, the balls contacting the discontinuous portions of the ball guide grooves of the outer race and the inner race will be quickly abraded due to the axial force and, as a result, the life of the ball bearing is relatively short.

SUMMARY OF THE INVENTION

An object of the invention is to provide a torque variation absorbing device with a ball bearing disposed between a first flywheel and a second flywheel and a hysteresis mechanism disposed between the first and second flywheels to bias the first and second flywheels in directions away from each other wherein a partial abrasion of the balls is prevented so that the durability of the ball bearing and the torque variation absorbing device is improved.

The above-described object of the invention is attained by a torque variation absorbing device in accordance with the present invention.

The torque variation absorbing device in accordance with the present invention includes a first flywheel, a second flywheel coaxial with and rotatable relative to the first flywheel, at least one damping mechanism provided between the first flywheel and second flywheel, a hysteresis mechanism disposed between the first flywheel and the second flywheel so as to bias the first flywheel and the second flywheel in directions away from each other, and a ball bearing disposed between the first flywheel and the second flywheel. The ball bearing includes an inner race, an outer race and a plurality of balls rotatably held between the inner race and the outer race. Each of the inner race and the outer race includes a ball inlet groove formed therein, and the each ball inlet groove opens toward the hysteresis mechanism.

In the above-described torque variation absorbing device, since the outer race and the inner race are provided with the ball inlet grooves, as many balls as possible can be assembled into the space defined between the outer race and the inner race through the ball inlet grooves so that the load to be born by each ball is minimized. Further, though the half portion of the ball guide groove formed in the inner race located farther from the hysteresis mechanism is pushed by the balls biased by the hysteresis mechanism in the direction away from the hysteresis mechanism, that half portion of the ball guide groove formed in the inner race is circumferentially continuous and the balls will not be severely abraded. As a result, the durability of the ball bearing is increased and the life of the torque variation absorbing device is improved.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 7 is a cross-sectional view of a torque variation absorbing device disclosed in Japanese Utility Model Publication 61-23545; and FIG. 8 is an enlarged, cross-sectional view of a ball bearing and members located in the vicinity of the ball bearing of the torque variation absorbing device of FIG. 7.

DETAILED DESCRIPTION OF THE PREFERRED EMBODIMENTS

Figure 1:
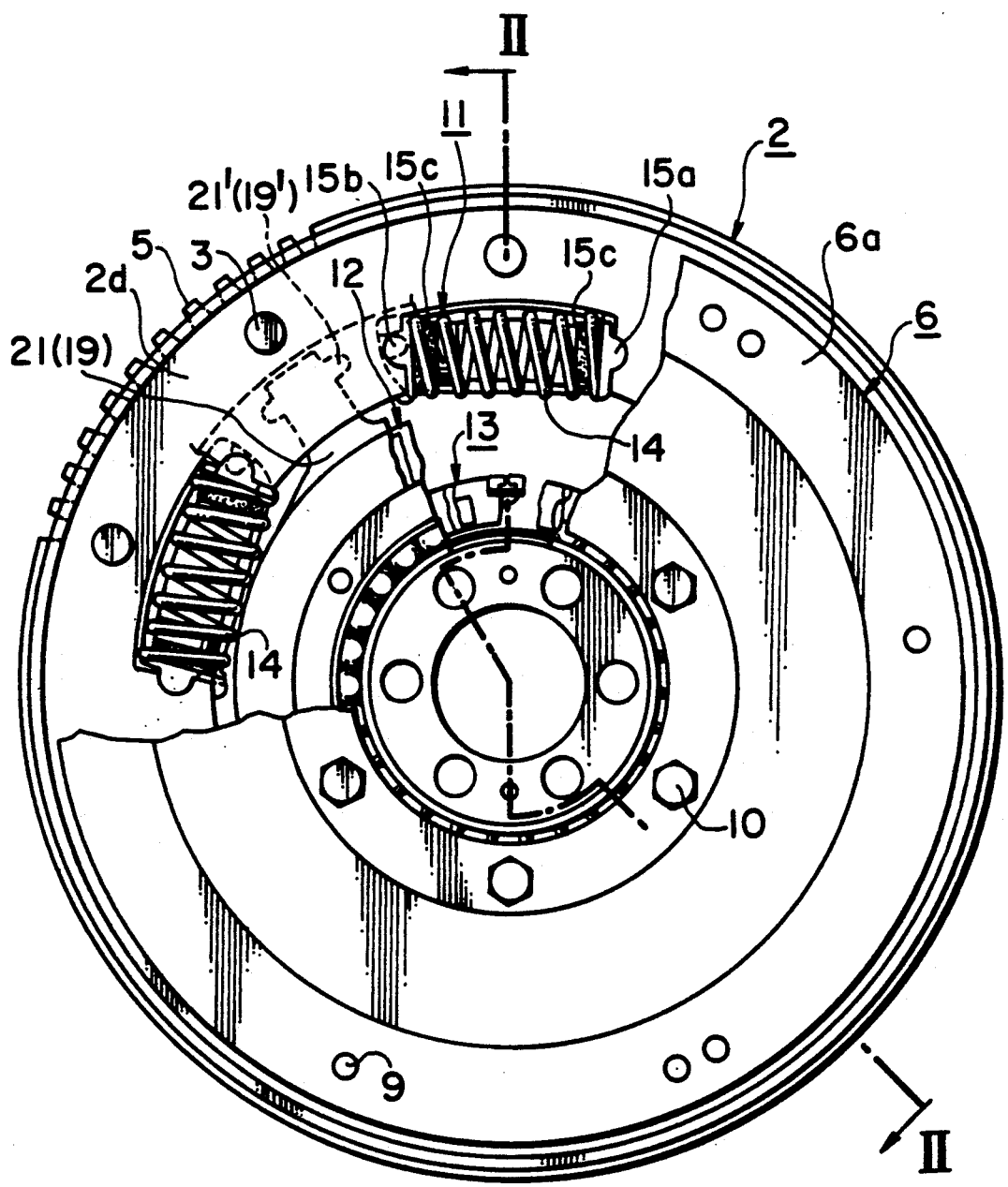
FIG. 1 is a partially broken, front elevational view of a torque variation absorbing device in accordance with one embodiment of the present invention.
Figure 2:
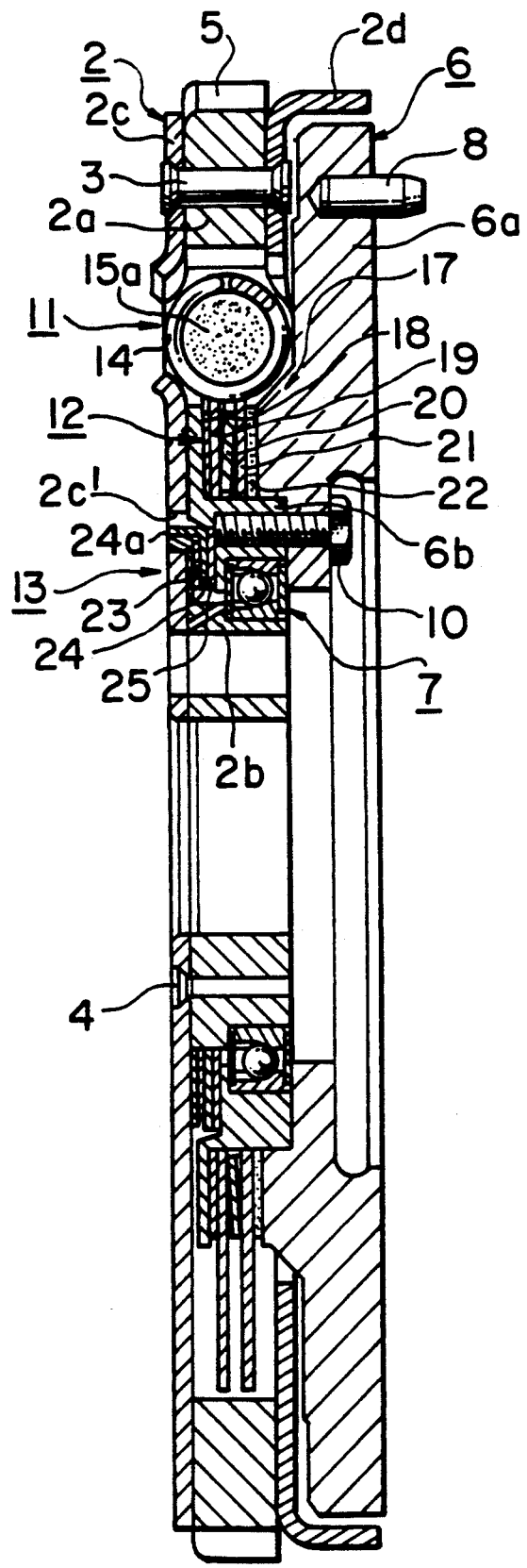
FIG. 2 is a cross-sectional view of the torque variation absorbing device of FIG. 1 taken along line II—II of FIG. 1.

As illustrated in FIGS. 1 and 2, a torque variation absorbing device in accordance with one embodiment of the present invention generally includes a first flywheel 2, a second flywheel 6 coaxial with and rotatable relative to the first flywheel 2, at least one damping mechanism 11 (which can be called a spring mechanism) provided between the first flywheel 2 and second flywheel 6, a hysteresis mechanism 13 disposed axially between the first flywheel 2 and the second flywheel 6 so as to bias the first flywheel 2 and the second flywheel 6 in directions away from each other, and a ball bearing 7 disposed radially between the first flywheel 2 and the second flywheel 6. In the embodiment of FIGS. 1 and 2, the first flywheel 2 comprises a drive side flywheel to be coupled to an engine crankshaft (not shown) and the second flywheel 6 comprises a driven side flywheel to be coupled to a power train of a vehicle including a clutch (not shown). Therefore, the first flywheel and the second flywheel will be called a drive side flywheel 2 and a driven side flywheel 6 hereinafter, respectively, though the first flywheel and the second flywheel are not limited to the drive side flywheel and the driven side flywheel.

The torque variation absorbing device may further include at least one driven disk 19, 21 coaxial with and rotatable relative to the first flywheel 2 and the second flywheel 6 and a torque limiting mechanism 11. The damping mechanism 11 is provided between the drive side flywheel 10 and the at least one driven disk 19, 20, and the torque limiting mechanism 12 is provided between the at least one driven disk 19, 21 and the driven side flywheel 6. The series combination of the damping mechanism 11 and the torque limiting mechanism 12 is in parallel with the hysteresis mechanism 13.

The drive side flywheel 2 includes an outer ring 2a, an inner ring 2b disposed radially inside and spaced from the outer ring 2a, an engine side drive plate 2c, and a clutch side drive plate 2d. A ring gear 5 which engages a pinion gear (not shown) of a starter motor (not shown) is formed in a radially outer portion of the outer ring 2a. The ring gear 5 may be formed separate from the outer ring 2a to be fixed to an outer surface of the outer ring 2a. The engine side drive plate 2c and the clutch side drive plate 2d are fastened to the outer ring 2a by at least one rivet 3. The inner ring 2b is fixed to the engine side drive plate 2c by at least one screw 4, and the inner ring 2b and the engine side drive plate 2c are fastened to an engine crankshaft by at least one bolt (not shown). The engine side drive plate 2c and the clutch side drive plate 2d are constructed of steel. At least one window is formed in each of the engine side drive plate 2c and the clutch side drive plate 2d, and the at least one damping mechanism 11 is supported in the at least one window so as to detachably contact wall portions of each of the drive plates 2c and 2d defining circumferential ends of the at least one window.

The driven side flywheel 6 includes a main driven side flywheel body 6a axially opposing the drive side flywheel 2 and a driven plate 6b fixed to the main driven side flywheel body 6a by at least one bolt 10. The driven side flywheel 6 is rotatably supported by the inner ring 2b of the drive side flywheel 2 at the driven plate 6b via the bearing 7. A pin 8 for positioning a clutch is pressed into a hole formed in the main driven side flywheel body 6a and at least one screw hole 9 for fixing a clutch cover (not shown) is formed in the main driven side flywheel body 6a.

The at least one driven disk includes driven disks 19 and 21 disposed so as to be oppose each other in the axial direction of the torque variation absorbing device. Each of the driven disks 19 and 21 includes an annular portion, at least one arm extending radially outwardly from the annular portion, and a protrusion 19', 21' (see FIG. 1) protruding from the arm in the circumferential direction of the torque variation absorbing device. The driven disks 19 and 21 are brought into contact with the spring mechanism 11 at the protrusion 19' and 21'. The driven disks 19 and 21 contact the torque limiting mechanism 12 at the annular portion thereof.

Each of the at least one damping mechanism 11 includes a coil spring 14 extending in the circumferential direction of the torque variation absorbing device, a drive side spring seat 15a disposed at one end of the coil spring 14, a driven side spring seat 15b disposed at another end of the coil spring 14, and a cushion 15c constructed of rubber and attached to at least one of the spring seats 15a and 15b. The damping mechanism 11 is detachably supported in the windows formed in the engine side drive plate 2c and the clutch side drive plate 2d. When no torque acts on the torque variation absorbing device, the damping mechanism 11 contact the portions of the engine side drive plate 2c and the clutch side drive plate 2d defining circumferential ends of the windows. When the drive side flywheel 2 and the damping mechanism 11 rotate relative to the driven disks 19 and 21 and the driven side flywheel 6, the damping mechanism 11 is brought into contact with the driven disks 19 and 21. When the torque acting on the torque variation absorbing device increases, the coil spring 14 is deformed to be compressed. When the torque further increases, the cushion 15c of one spring seat 15a is finally bought into contact with the other, opposite spring seat 15b. When the torque further increases, the cushion 14c begins to be compressed, and both the coil spring 14 and the cushion 15c operate. When the torque further increases and the torque reaches a predetermined torque, the torque limiting mechanism 12 begins to slide or slip.

The torque limiting mechanism 12 is held in a concave space 17 defined by the main driven side flywheel member 6a and the driven plate 6b. The torque limiting mechanism 12 includes frictional linings 18 and 22 and a cone spring 20. One of the frictional lining 18 is disposed between the driven disk 19 and the driven plate 6b, and another frictional lining 22 is disposed between the driven disk 21 and the main driven side flywheel body 6a. The cone spring 20 is disposed between the driven disks 19 and 21 and generates a predetermined axial biasing force. The torque limiting mechanism 12 begins to slide or slip when the torque acting on the torque variation absorbing device becomes greater than the predetermined torque determined by the cone spring 20. The torque limiting mechanism 12 cuts the torque component exceeding the predetermined torque to protect the power train from an excessively great torque. When the torque acting on the torque variation absorbing device is smaller than the predetermined torque, the torque limiting mechanism 12 does not slide or slip, and therefore the driven disks 19 and 21 and the driven side flywheel 6 rotate together.

Figure 3:
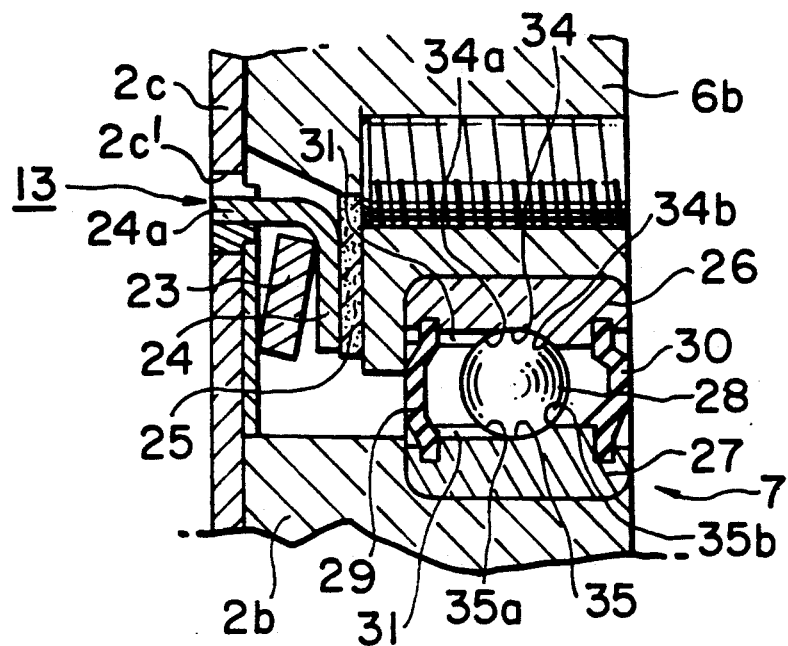
FIG. 3 is an enlarged, cross-sectional view of a ball bearing and members located in the vicinity of the ball bearing of the torque variation absorbing device of FIG. 2.

The hysteresis mechanism 13 is disposed axially between the engine side drive plate 2c of the drive side flywheel 2 and the driven plate 6b of the drive side flywheel 6. As illustrated in FIG. 3, the hysteresis mechanism 13 includes a cone spring 23, a frictional plate 24, and a frictional lining 25 constructed of abrasive material. One portion 24a of the frictional plate 24 is bent toward the engine side drive plate 2c and protrudes into a hole 2c' formed in the engine side drive plate 2c to engage the engine side drive plate 2c in the circumferential direction of the torque variation absorbing device. The hysteresis mechanism 13 generates a frictional force whenever the drive side flywheel 2 and the driven side flywheel 6 rotate relative to each other. The cone spring 23 of the hysteresis mechanism 13 generates an axial biasing force so that the drive side flywheel 2 and the driven side flywheel 6 are biased in directions away from each other.

The ball bearing 7 is disposed radially between the inner ring 2b of the drive side flywheel 2 and the driven plate 6b of the driven side flywheel 6. As illustrated in FIG. 3, the ball bearing 7 includes an inner race 27, an outer race 26 and a plurality of balls 28 rotatably guided between the inner race 27 and the outer race 26. The inner race 27 is fixed to the inner ring 2b and the outer race 26 is fixed to the driven plate 6b. Seal members 29 and 30 are provided at axially opposite end portions of the ball bearing 7 and a grease for lubrication is filled in the space defined between the seal members 29 and 30 and between the outer race 26 and the inner race 27.

Figure 4:
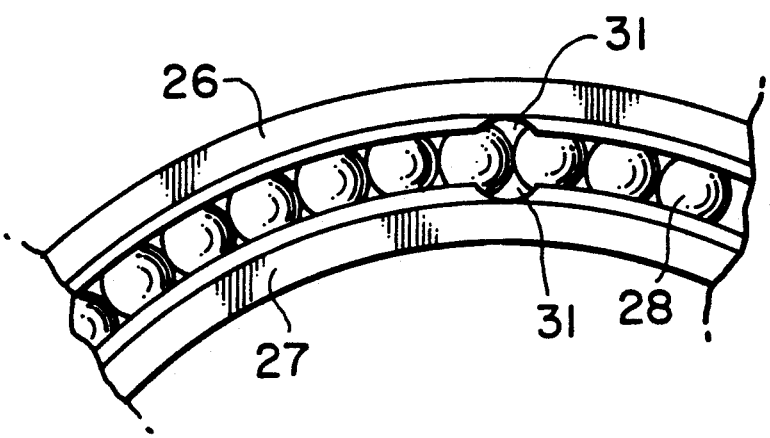
FIG. 4 is a partial and enlarged front elevational view of the ball bearing of the torque variation absorbing device of FIG. 1.
Figure 5:
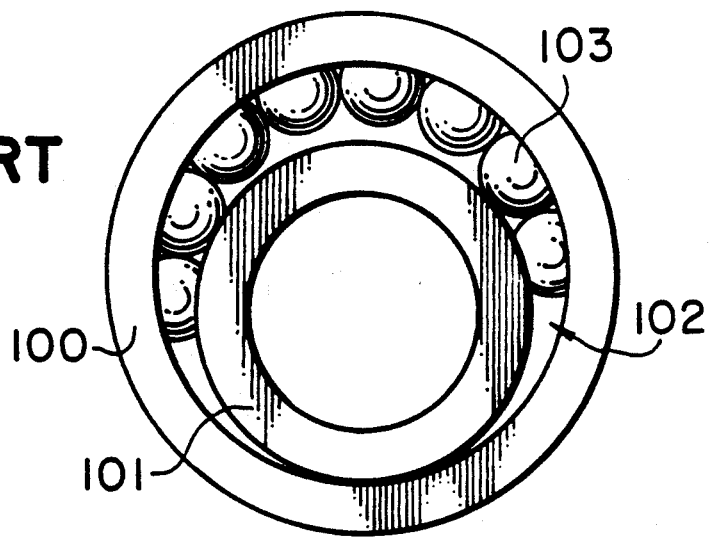
FIG. 5 is a front elevational view of a prior art deep groove ball bearing illustrating how to assemble the balls.
Figure 6A:
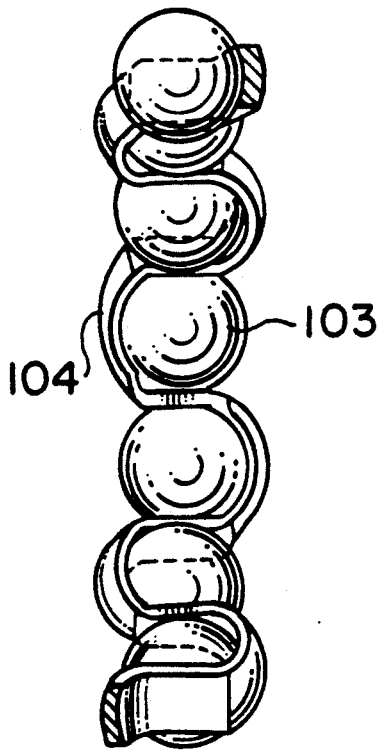
FIG. 6a is an elevational view of a half portion of a conventional deep groove ball bearing with a first type as viewed from inside the ball bearing.
Figure 6B:
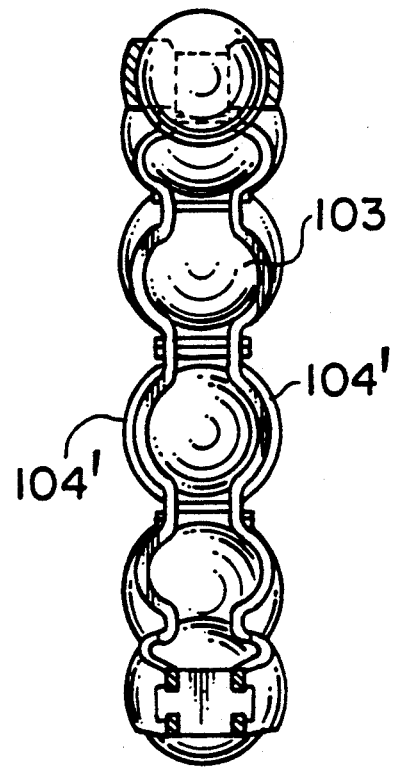
FIG. 6b is an elevational view of a half portion of a conventional deep groove ball bearing with a second type retainer as viewed from inside the ball bearing.

As illustrated in FIG. 3, the inner race 27 includes a ball inlet groove 31 formed therein and the outer race 26 includes a ball inlet groove 31 formed therein. The ball inlet grooves 31 formed in the inner race 27 and the outer race 26 extend straight in the axial direction of the torque variation absorbing device. As illustrated in FIG. 4, each of the ball inlet groove 31 formed in the inner race 27 and the ball inlet groove 31 formed in the outer race 26 has the contour of an arc having the diameter equal to or a little greater than a diameter of each ball 28 so that balls 28 can pass through a ball inlet defined by the ball inlet grooves 31. When the balls 28 are inserted through the ball inlet grooves 31 formed in the inner race 27 and the outer race 26, the ball inlet groove 31 formed in the inner race 27 and the ball inlet groove 31 formed in the outer race 26 should be brought to the same radial position as shown in FIG. 4.

As illustrated in FIG. 3, the ball inlet grooves 31 formed in the inner race 27 and the outer race 26 open toward the hysteresis mechanism 13. The ball inlet groove 31 formed in the inner race 27 does not open in the direction away from the hysteresis mechanism. Therefore, a half portion 35b of the ball guide groove 35 formed in at least the inner race 27 located farther from the hysteresis mechanism 13 is continuous, that is, not interrupted by the ball inlet grooves 31, in the circumferential direction of the torque variation absorbing device. Though the half portion 35b of the ball guide groove 35 formed in the inner race 27 is axially pressed by the balls 28 biased by the hysteresis mechanism 13 and is likely to be abraded, the continuity of the half portion 35 in the circumferential direction will effectively suppress the abrasion.

Since as many balls 28 as possible can be inserted into the space defined between the inner race 27 and the outer race 26 through the ball inlet grooves 31, the balls 28 are arranged so as to be close to each other in the circumferential direction of the torque variation absorbing device. As a result, since the number of the balls 28 is increased, a load acting on each ball 28 is decreased and the durability of the ball bearing 7 is improved.

Next, operation of the torque variation absorbing device will be explained.

A torque transmitted from a drive source such as an engine is transmitted from an engine crankshaft to the drive side flywheel 2. This torque is transmitted in turn from the drive side flywheel 2 via the damping mechanism 11, the torque limiting mechanism 12 and the hysteresis mechanism 13 to the driven side flywheel 6. These members constitute a mass-spring vibrational system. More particularly, the drive side flywheel 2 and the driven side flywheel 6 define moments of inertia, the damping mechanism 11 defines a spring constant, and the hysteresis mechanism 13 defines a frictional damping constant, respectively, of the vibration damping system. The torque variation and speed variation are effectively absorbed by the vibration damping system.

When the drive side flywheel 2 rotates relative to the driven disks 19 and 21 and the driven side flywheel 6, the drive side spring seat 15a of the damping mechanism 11 which rotates together with the drive side flywheel 2 is brought into contact with the protrusions 19' and 21' of the driven disks 19 and 21. When the torque increases, the damping mechanism 11 pushes the driven disks 19 and 21, and the coil spring 14 of the damping mechanism 11 is compressed and deformed. When the torque further increases, the cushions 15c fixed to the spring seats 15a and 15b are brought into contact with each other and begin to be compressed so that both the spring 14 and the cushions 15c operate to provide a spring constant. When the torque further increases and finally exceeds the predetermined torque determined by the biasing force of the cone spring 19 of the torque limiting mechanism 12, the torque limiting mechanism 12 begins to slide or slip so that the driven side flywheel 6 rotates relative to the driven disks 19 and 21 to cut the torque component exceeding the predetermined torque.

When the drive side flywheel 2 and the driven side flywheel 6 rotate relative to each other, the balls 28 of the ball bearing 7 rotate and move along the outer race 26 and the inner race 27. In this instance, at least one ball 28 will pass through the position corresponding to the ball inlet groove 31.

The cone spring 23 of the hysteresis mechanism 13 pushes the outer race 26 of the bearing 7 toward the driven side flywheel 6. Therefore, the balls 28 of the ball bearing 7 are pushed toward the driven side flywheel 6 and are pushed against the half portion 35b of the ball guide groove 35 formed in the inner race 27 located farther from the hysteresis mechanism 13. Since the ball inlet grooves 31 open toward the hysteresis mechanism 13, the half portion 35b of the ball guide groove 35 is continuous in the circumferential direction of the torque variation absorbing device, while the opposite half portion 35a located nearer to the hysteresis mechanism 13 is discontinuous in the circumferential direction at the ball inlet groove 31. Therefore, the pushed balls 28 do not contact the discontinuous portion of the inner race 27 and are not subjected to a heavy abrasive. If there were a discontinuous portion in the half portion 35b of the ball guide groove 35 formed in the inner race 27 located farther from the hysteresis mechanism 13, the balls 28 pushed against the discontinuous portion would receive shock loads when passing the discontinuous portion and would be severely abraded in a relatively short period of time.

Further, since the degree of rotation of the ball 28 relative to the inner race 27 is less than the degree of rotation of the ball 28 relative to the outer race 26, the abrasion of the ball 28 caused through the contact with the inner race 27 tends to be more concentrated than the abrasion of the ball 28 caused through contact with the outer race 26. Furthermore, since the balls 28 contact the circumferentially convex surface of the inner race 27 while the balls 28 contact the circumferentially concave surface of the outer race 26, the load is apt to be more concentrated at the contact portion between the balls 28 and the inner race 26 than at the contact portion between the balls 28 and the outer race 27. Therefore, the ball 28 would be subjected to a more severe abrasion at a portion of the ball contacting the inner race 27, if there were a discontinuous portion in the half portion 35b of the ball guide groove 35 of the inner race 27.

With respect to the outer race 26, though there is a ball inlet groove 31 in the half portion 34a of the ball guide groove 34 formed in the outer race 26, the ball inlet groove 31 does not push the ball 28 and does not cause a severe abrasion in the ball 28.

Further, since as many balls 28 as possible are inserted in the space defined between the outer race 26 and the inner race 27, a load acting on each ball 28 is minimized as compared with a load of the conventional ball bearing having a gap between two adjacent balls.

Due to this, the durability of the ball bearing 7 is further improved.

In accordance with the present invention, the following advantages will be obtained.

Since the ball inlet grooves 31 open toward the hysteresis mechanism 13, the axial biasing force caused by the hysteresis mechanism 13 is not transmitted to the ball 28 which is passing through the position of the ball inlet groove 31 formed in the outer race 26 and the balls 28 are not pushed against the discontinuous portion of the guide groove of the inner race 27. As a result, a partial abrasion of the balls 28 is suppressed. Further, since the outer race 26 and the inner race 27 are provided with the ball inlet grooves 31, as many balls 28 as possible are inserted into the circumferential space defined between the outer race 26 and the inner race 27 so as to be close to each other in the circumferential direction and therefore minimize the load acting on each ball 28. This improves the durability of the ball bearing 7 used in the torque variation absorbing device including a hysteresis mechanism 13 which generates an axial biasing force. As a result, the durability of the torque variation absorbing device is improved.

Further, a sudden load may act on the outer race 26 of the ball bearing 7 from a clutch via the driven side flywheel 6. In this instance, since the ball bearing 7 is biased by the cone spring 23 of the hysteresis mechanism 13 toward the driven side flywheel 6, such shock will be absorbed by the cone spring 23 of the hysteresis mechanism 13. As a result, the ball bearing 7 including the ball guide groove and the balls 28 will not be damaged by such shock.

Although only a few embodiments of the present invention have been described in detail, it will be appreciated by those skilled in the art that various modifications and alterations can be made to the particular embodiments shown without materially departing from novel teachings and advantages of the present invention. Accordingly, it is to be understood that all such modifications and alterations are included within the spirit and scope of the invention as defined by the following claims.

What is claimed is:

1. A torque variation absorbing device comprising:
 a first flywheel;
 a second flywheel coaxial with and rotatable relative to the first flywheel;
 at least one damping mechanism provided between the first flywheel and second flywheel;
 a hysteresis mechanism disposed between the first flywheel and the second flywheel so as to bias the first flywheel and the second flywheel in directions away from each other;
 a ball bearing disposed between the first flywheel and the second flywheel, the ball bearing including an inner race, an outer race and a plurality of balls positioned closely adjacent to each other and rotatably held between the inner race and the outer race, the inner race and the outer race including ball inlet grooves formed therein, each of the balls being of an outer abrasion at a position where each ball is in contact with a circumferential discontinuous portion of the ball inlet groove of the outer race and being of an inner abrasion at a position where each ball is in contact with a circumferential discontinuous portion of the ball inlet groove of the inner race, the inner abrasion being greater than the outer abrasion, the ball inlet grooves opening toward the hysteresis mechanism;

wherein said hysteresis mechanism further comprises a cone spring, the cone spring generating an axial biasing force so that a half portion of the guide groove formed in the outer race located nearer to the hysteresis mechanism pushes the balls and the pushed balls push a half portion of the guide groove formed in the inner race located farther from the hysteresis mechanism to prevent each of the balls from being in contact with the discontinuous portion of the inner race, the cone spring also functioning as a cushion when a force directed toward the hysteresis mechanism acts on the ball bearing; and wherein the inner race and the outer race include ball guide grooves facing each other, a half portion of the ball guide groove formed in at least a side of the inner race located farther from the hysteresis mechanism being circumferentially continuous.

2. The torque variation absorbing device according to claim 1, wherein the ball inlet grooves formed in the inner race and the outer race being positioned along the same radial position when the balls are inserted into a space defined between the inner race and the outer race through the ball inlet grooves.

3. The torque variation absorbing device according to claim 1, wherein the ball inlet groove formed in the inner race and the ball inlet groove formed in the outer race has the contour of an arc having a diameter equal to a diameter of each of the balls.

4. The torque variation absorbing device according to claim 1, wherein the ball inlet grooves extend straight in an axial direction of the torque variation absorbing device.

5. The torque variation absorbing device according to claim 1, wherein the ball bearing further includes seal members disposed at axially opposite end portions of the ball bearing.

6. The torque variation absorbing device according to claim 1, wherein the first flywheel comprises a drive side flywheel to be coupled to an engine crankshaft, and the second flywheel comprises a driven side flywheel.

7. The torque variation absorbing device according to claim 6, further comprising:

at least one driven disk coaxial with and rotatable relative to the drive side flywheel and the driven side flywheel; and torque limiting means for limiting a torque component exceeding a predetermined torque when a torque greater than the predetermined torque acts on the torque variation absorbing device, and wherein the at least one damping mechanism is arranged between the drive side flywheel and the at least one driven disk, and the torque limiting means is arranged between the at least one driven disk and the driven side flywheel so as to be in series with the at least one damping mechanism, the series combination of the at least one damping mechanism and the torque limiting means being arranged in parallel with the hysteresis mechanism.

8. The torque variation absorbing device according to claim 7, wherein the torque limiting means includes a friction lining of abrasive material and a cone spring.

9. The torque variation absorbing device according to claim 6, wherein the drive side flywheel includes an outer ring, an inner ring disposed radially inside the outer ring, an engine side drive plate and a clutch side drive plate, the engine side drive plate and the clutch side drive plate being fastened to the outer ring, the inner ring being fastened to the engine side drive plate, and wherein the driven side flywheel includes a main driven side flywheel body disposed so as to be axially opposite to the drive side flywheel and a driven plate fastened to the main driven side flywheel body, the ball bearing being disposed radially between the inner ring of the drive side flywheel and the driven plate of the driven side flywheel, the hysteresis mechanism being disposed axially between the engine side drive plate of the drive side flywheel and the driven plate of the driven side flywheel.

10. The torque variation absorbing device according to claim 1, wherein each of the at least one damping mechanism includes a coil spring and spring seats disposed at opposite ends of the coil spring, at least one of the opposite spring seats being attached to an elastmeric cushion.

11. The torque variation absorbing device according to claim 1, wherein the hysteresis mechanism includes a cone spring, a friction plate, and a friction lining of abrasive material.

12. The torque variation absorbing device according to claim 1, wherein the ball inlet groove formed in the inner race and the ball inlet groove formed in the outer race has the contour of an arc having a diameter greater than a diameter of each of the balls.

13. The torque variation absorbing device according to claim 1, wherein the ball inlet groove formed in the inner race and the ball inlet groove formed in the outer race has the contour of an arc having a diameter greater than a diameter of each of the balls.

* * * * *